United States Patent
Bock

(10) Patent No.: US 12,129,718 B1
(45) Date of Patent: Oct. 29, 2024

(54) APPARATUS AND METHOD TO FORM CENTRALIZER BLADES ON WELLBORE TUBULAR

(71) Applicant: Weatherford Technology Holdings, LLC, Houston, TX (US)

(72) Inventor: Micheal Bock, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 18/205,197

(22) Filed: Jun. 2, 2023

(51) Int. Cl.
  *E21B 17/10* (2006.01)
  *C23C 4/16* (2016.01)

(52) U.S. Cl.
  CPC ............ *E21B 17/1078* (2013.01); *C23C 4/16* (2013.01)

(58) Field of Classification Search
  CPC .... E21B 17/1078; E21B 17/1085; C23C 4/16
  See application file for complete search history.

(56) References Cited

U.S. PATENT DOCUMENTS

| | | | |
|---|---|---|---|
| 2,904,313 A * | 9/1959 | Wisenbaker, V | ........ E21B 10/26 175/426 |
| 3,348,295 A * | 10/1967 | Bass, Jr. | ............. E21B 17/1078 29/402.13 |
| 5,566,754 A * | 10/1996 | Stokka | ................. E21B 17/1078 166/241.6 |
| 7,409,758 B2 | 8/2008 | Le et al. | |
| 7,487,840 B2 | 2/2009 | Gammage et al. | |
| 8,573,296 B2 * | 11/2013 | Levie | .................. E21B 17/1078 166/241.1 |
| 8,844,624 B2 | 9/2014 | Buytaert et al. | |
| 9,115,546 B2 | 8/2015 | Howlett | |
| 9,745,803 B2 | 8/2017 | Buytaert et al. | |
| 9,765,576 B2 | 9/2017 | Buytaert et al. | |
| 9,909,395 B2 * | 3/2018 | Wang | .................. B23K 26/0006 |
| 9,920,412 B2 * | 3/2018 | Scott | ........................ C22C 38/54 |
| 11,286,728 B2 * | 3/2022 | Allen | .................. E21B 17/1085 |
| 11,982,136 B2 * | 5/2024 | Leung | .................. E21B 17/1078 |

(Continued)

FOREIGN PATENT DOCUMENTS

| | | |
|---|---|---|
| CN | 203403837 U | 1/2014 |
| CN | 204002618 U | 12/2014 |

(Continued)

OTHER PUBLICATIONS

Innovex, "Composite Centralizers," Brochure, dated May 19, 2021, 8-pages.

(Continued)

*Primary Examiner* — Kenneth L Thompson
(74) *Attorney, Agent, or Firm* — Cabello Hall Zinda, PLLC

(57) ABSTRACT

A tubular is prepared for downhole use to include integrated centralizer feature disposed thereon. Blade elements are disposed about a surface of the tubular. An interconnection, such as a band, connected between the blade elements can be used to wrap them circumferentially about the tubular. The blade elements are then affixed to the surface of the tubular to produce the integrated centralizer features by coating a spray welding material over at least a portion of the plurality of blade elements and over at least an adjacent portion of the surface of the tubular. The blade elements can be hollow vanes or fins so they are collapsible when a restriction is encountered downhole to avoid a stuck pipe situation.

21 Claims, 5 Drawing Sheets

(56) References Cited

U.S. PATENT DOCUMENTS

2015/0060050 A1    3/2015   Scott et al.
2016/0060968 A1    3/2016   Xie
2021/0025248 A1*   1/2021   Krieger ............... E21B 17/1078

FOREIGN PATENT DOCUMENTS

CN    209799894       12/2019
CN    218376364 U     1/2023

OTHER PUBLICATIONS

Innovex, "OptiMIZER," Brochure, dated Sep. 2021, 1-page.
Innovex, "WearSox(R)—On the Pipe Solutions," Brochure, dated Sep. 2021, 1-page.
Innovex, "Well Construction: Centralizers," Brochure, dated Aug. 12, 2021, 2-pages.
Weatherford, "Casing Accessories," Brochure, copyright 2005-2016, 56-pages.
Weatherford, "SpiraGlider(TM) Centralizer System," Brochure, copyright 2008-2013, 8-pages.
Whitehorse Technology, "Casing Centralizers: CuNia Benefits," obtained from www.whitehorsetechnology.com, undated, generated Jun. 2, 2023, 4-pages.
Int'l Search Report and Written Opinion in PCT/US2024/022520 mailed Jul. 24, 2024, 11-pgs.

* cited by examiner

100

```
┌─────────────────────────────────────────────────────────────┐
│ Place a plurality of blade elements about a surface of the  │
│ tubular                                                     │
│ 110                                                         │
└─────────────────────────────────────────────────────────────┘
        │
        ▼
   ┌──────────────────────────────────────────────────────┐
   │ Wrap at least one interconnecting element about the  │
   │ surface of the tubular                               │
   │ 112                                                  │
   ├──────────────────────────────────────────────────────┤
   │ Pre-form the blade elements in a ring structure      │
   │ for slipping on the tubular                          │
   │ 114                                                  │
   ├──────────────────────────────────────────────────────┤
   │ Align longitudinal lengths of the blade elements     │
   │ longitudinally relative to a longitudinal axis of the│
   │ tubular; or Spiral the longitudinal lengths of the   │
   │ blade elements relative to the longitudinal axis of  │
   │ the tubular.                                         │
   │ 116                                                  │
   └──────────────────────────────────────────────────────┘
        │
        ▼
┌─────────────────────────────────────────────────────────────┐
│ Affix the blade elements to the surface of the tubular      │
│ 120                                                         │
└─────────────────────────────────────────────────────────────┘
        │
        ▼
┌─────────────────────────────────────────────────────────────┐
│ Coat a spray welding material over at least a portion of    │
│ the blade elements and over at least an adjacent portion    │
│ of the surface of the tubular                               │
│ 122                                                         │
├─────────────────────────────────────────────────────────────┤
│ Coat the spray welding material over the at least           │
│ interconnecting element and over at least an adjacent       │
│ portion of the surface of the tubular                       │
│ 124                                                         │
├─────────────────────────────────────────────────────────────┤
│ Coat the spray welding material by performing at least one  │
│ of an electric arc spray process, a twin-wire arc thermal   │
│ spray process (TWA), a combustion powder spray process, a   │
│ wire spray process, a High-Velocity Oxygen Fuel Spray       │
│ process, a cold spray process, a detonation spray process,  │
│ a plasma spray process, or and a laser cladding process     │
│ 126                                                         │
└─────────────────────────────────────────────────────────────┘
```

*FIG. 9*

APPARATUS AND METHOD TO FORM CENTRALIZER BLADES ON WELLBORE TUBULAR

BACKGROUND OF THE DISCLOSURE

Centralizers are used on wellbore tubulars for a number of purposes. For example, centralizers can be used to center tubing and basepipes in a wellbore for cementing, gravel packing, or other downhole operations.

The centralizers typically include cylindrical collars that can be installed on the tubulars in a number of ways. For example, a centralizer collar can be mechanically affixed to the tubular using fasteners, or the centralizer collar can be welded directly to the tubular. A slip-on centralizer collar can be placed on the tubular and can be held longitudinally using one or more stop collars affixed on the tubular. Alternatively, the slip-on centralizer can be installed on a tubing subcomponent having shoulders to hold the slip-on centralizer.

The centralizers can have bowed springs connected between collars, or the centralizers can have straight or angled blades disposed about the circumference of the collars. The blades can be rigid to provide positive standoff, or they can be collapsible for passage through tighter clearances. The centralizer collars can be rotationally fixed on the tubular, or slip-on type centralizer collars may be allowed to rotate on the tubular.

In contrast to the separate centralizer collars installed on tubulars as noted above, manufacturers are starting to directly form centralizer features on tubulars by building-up blades from multiple layers of spray weld material until a desired blade outside diameter is achieved. To build-up the centralizer blades directly on the exterior of the tubular, operators can use a twin wire arc thermal spray process to deposit material and build-up the centralizer features (i.e., blade shapes) directly onto the metal of the tubular. The built-up features can provide centralization, stabilization, and wear resistance to the tubular. The built-up features can also be applied to a tubular to form stops for bow spring or slip-on centralizer collars. The process of building-up the centralizer blades directly on the exterior of the tubular can be expensive and time consuming. Additionally, the process requires each layer of material to properly adhere to the layer below, so the material remains rigid and does not delaminate. This high rigidity for the centralizer features is not always desired.

The subject matter of the present disclosure is directed to overcoming, or at least reducing the effects of, one or more of the problems set forth above.

SUMMARY OF THE DISCLOSURE

Some implementations herein relate to a method, such as a method of preparing a tubular for downhole use. For example, method may include placing a plurality of blade elements about a surface of the tubular. Method may also include affixing the plurality of blade elements to the surface of the tubular. For example, a spray welding material can be coated over at least a portion of the plurality of blade elements and can be coated over at least an adjacent portion of the surface of the tubular.

The described implementations may also include one or more of the following features. Each of the plurality of blade elements may include a hollow vane having a bent contour with a concave face and a convex face. Placing the plurality of blade elements about the surface of the tubular may include placing the concave face against the surface of the tubular. Coating the spray welding material over at least the portion of the plurality of blade elements and over at least the adjacent portion of the surface of the tubular may include coating the spray welding material over at least a portion of an edge on the convex face of the hollow vanes.

Each of the plurality of blade elements may include at least one of an elongated blade, vane, fin, and rib having: a longitudinal length between opposing ends, a width between opposing sides, and a thickness between opposing faces. Placing the plurality of blade elements about the surface of the tubular may include placing one of the opposing faces against the surface of the tubular. Coating the spray welding material may include coating the spray welding material on at least a portion of an edge on the other opposing face of the blade element.

Each of the plurality of blade elements may include a solid rib having opposing faces. Placing the plurality of blade elements about the surface of the tubular may include placing one of the opposing faces against the surface of the tubular. Coating the spray welding material may include coating the spray welding material on at least a portion of an edge on the other opposing face of the blade element.

In the method, placing the plurality of blade elements about the surface of the tubular may include wrapping at least one interconnecting element about the surface of the tubular. The at least one interconnecting element can interconnect the plurality of blade elements. Coating the spray welding material over at least the portion of the plurality of blade elements and the surface of the tubular adjacent thereto may include coating the spray welding material over the at least interconnecting element and an adjacent portion of the tubular.

In the method, the plurality of blade elements can be initially formed to each have an external face extending along a longitudinal length between opposing ends and extending across a lateral width between opposing sides. Initially forming the plurality of blade elements may include at least one of: forming the plurality of blade elements from a plate material; forming the plurality of blade elements with at least one interconnecting element integrally connected therebetween; forming the plurality of blade elements and affixing the plurality of blade elements to the at least one interconnecting element; pre-forming the plurality of blade elements in a bent condition to place against a circumference; and pre-forming the plurality of blade elements a flat condition to bend against a circumference.

Initially forming the plurality of blade elements may include forming the external face as rounded; and forming the opposing ends as rounded.

Placing the plurality of blade elements about the surface of the tubular may include: aligning longitudinal lengths of the plurality of blade elements longitudinally relative to a longitudinal axis of the tubular; or spiraling the longitudinal lengths of the plurality of blade elements relative to the longitudinal axis of the tubular.

In the method, coating the spray welding material may include performing at least one of an electric arc spray process, a twin-wire arc thermal spray process (TWA), a combustion powder spray process, a wire spray process, a High-Velocity Oxygen Fuel Spray process, a cold spray process, a detonation spray process, a plasma spray process, and a laser cladding process.

Some implementations herein relate to an apparatus, such as a centralizer apparatus for use on a tubular. For example, the apparatus may include a plurality of blade elements having first and second faces. The first face can be configured to be placed adjacent to a surface of the tubular. The apparatus may also include at least one interconnecting element connected between the blade elements. The at least one interconnecting element can be configured to be disposed circumferentially about the surface of the tubular. The apparatus may furthermore include a spray welding material configured to coat over at least a portion of the plurality of blade elements, over the at least one interconnecting element, and over at least an adjacent portion of the surface of the tubular.

Some implementations herein relate to a tubular, such as a wellbore tubular used downhole. For example, the tubular may include a plurality of blade elements disposed about a surface of the tubular. The tubular may also include at least one interconnecting element connected between the blade elements. The tubular may furthermore include a spray welding material coated over at least a portion of the plurality of blade elements, over the at least one interconnecting element, and over at least an adjacent portion of the surface of the tubular. The described implementations of the tubular may also include one or more of the features described previously.

The foregoing summary is not intended to summarize each potential arrangement or every aspect of the present disclosure.

BRIEF DESCRIPTION OF THE DRAWINGS

FIG. 9 is a flow chart of a process according to the present disclosure to prepare a wellbore tubular for downhole use.

DETAILED DESCRIPTION OF THE DISCLOSURE

Figure 1:
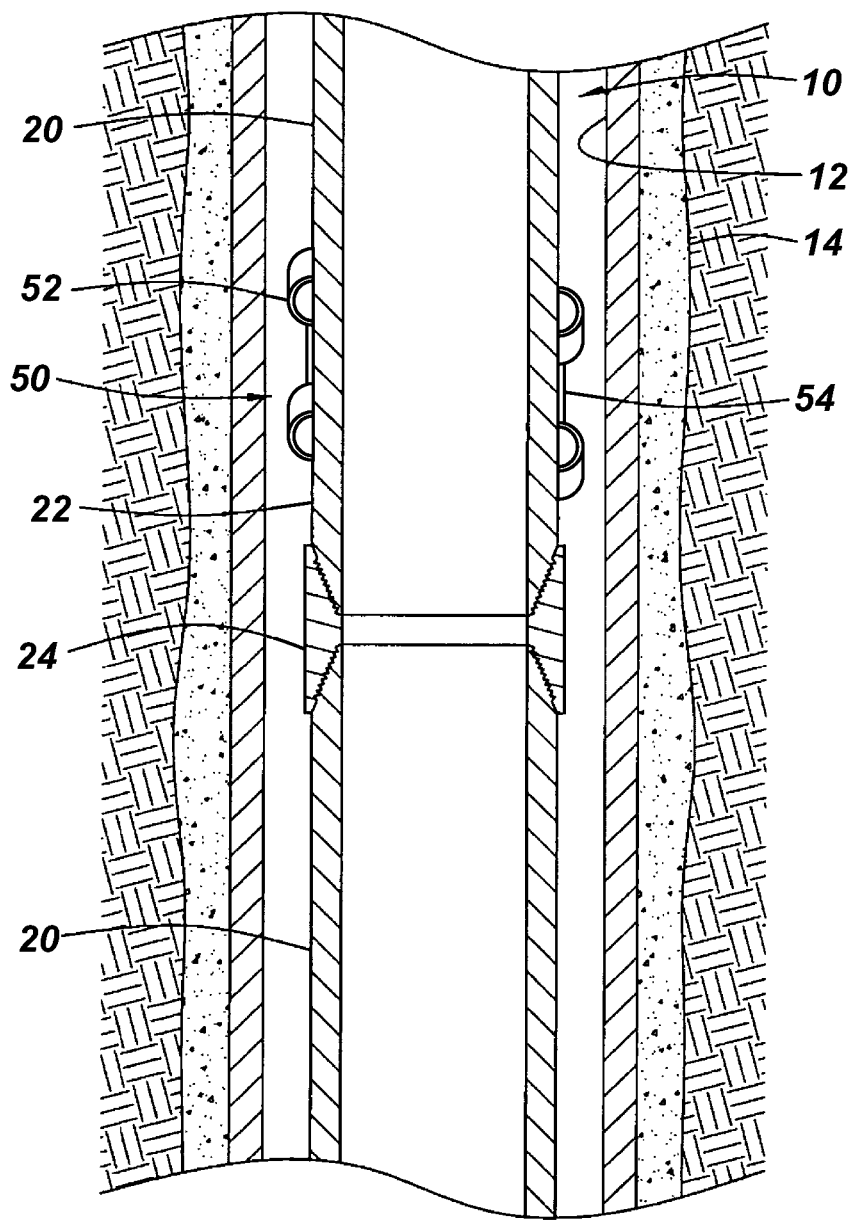
FIG. 1 illustrates a cross-sectional view of a tubular having a centralizer apparatus of the present disclosure.

FIG. 1 shows a cross-sectional view of a tubing string 10 disposed in an existing casing 12. The existing casing 12 has been cemented to line the wellbore. The tubing string 10 can be run into the wellbore with a drilling assembly disposed at a lower portion to extend the wellbore, or the tubing string 10 can have a gravel pack assembly or other bottom hole assembly disposed thereon. The tubing string 10 is shown having tubing components 20 (e.g., wellbore tubulars) connected together by a coupling 24. As is typical, the coupling 24 can have a larger outer diameter than the tubulars 20. Therefore, the coupling 24 is more likely to contact the existing casing 12 than the tubulars 20a-b during rotation. In other configurations, the tubulars 20 could have pin and box ends that mate together without the need for a separate coupling.

In FIG. 1, one or both of the tubulars 20 is equipped with one or more centralizer apparatus 50 of the present disclosure for reducing drag, providing a positive standoff in deviated or horizontal wellbores, or providing some other benefit known in the art. The centralizer apparatus 50 is positioned on the tubular 20 at any advantageous location, such as near one or both ends of the tubular 20.

Instead of being composed of a cylindrical collar as in the prior art affixed to the tubular 20 and instead of being built-up as in the prior art from layers of spray weld material directly on the tubular 20, the centralizer apparatus 50 of the present disclosure includes a plurality of blade elements 52 disposed about the surface 22 of the tubular 20 and affixed thereto using a spray weld material 54.

Figure 2:
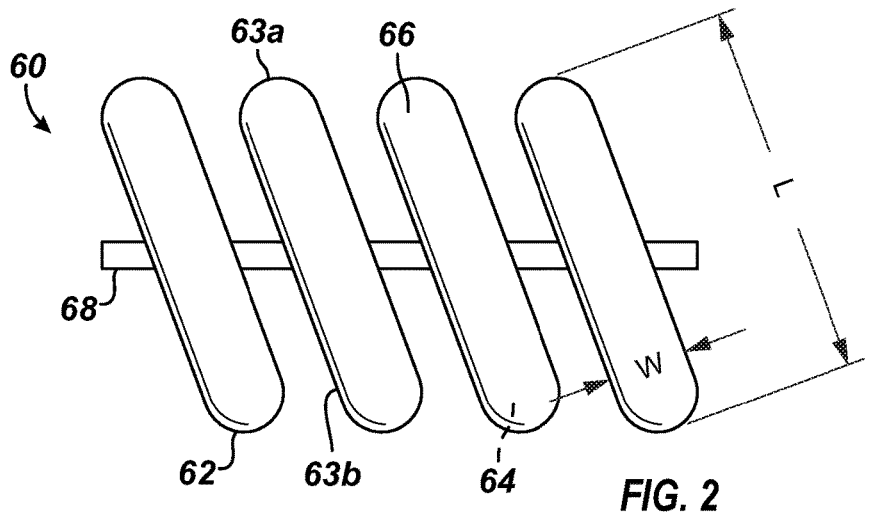
FIG. 2 illustrates an elevational view of an arrangement of a centralizer apparatus of the present disclosure.

FIG. 2 illustrates a centralizer apparatus 60 of the present disclosure for use on a tubing component. Here, the centralizer apparatus 60 is shown unassembled to a tubing component. The centralizer apparatus 60 comprises a plurality of blade elements 62 arranged parallel to one another. Each blade element 62 is elongated and flat. Namely, each of the plurality of blade elements 62 has an external face 66 extending along a longitudinal length (L) between opposing ends 63a and extending across a lateral width (W) between opposing sides 63b. Thus, each blade element 62 can be an elongated blade, vane, fin, or rib having the longitudinal length (L) between the opposing ends 63a, having a narrow width (W) between the opposing sides 63b, and having a thin thickness between opposing faces 64, 66.

At least one interconnecting element 68, such as a band, strip, or the like, connects the blade elements 62 to one another. The interconnecting element 68 can be composed of the same material as the blade elements 62 and can be integrally formed therewith. Alternatively, the interconnecting element 68 can be a separate component having the blade elements 62, which can be composed of the same or different material, affixed on or to the interconnecting element 68. Although shown as a single band or strip, the interconnecting element 68 can include multiple bands or strips and can include other constructions, such as a mesh.

As shown here, the blade elements 62 can be arranged at an angle so they will spiral about the circumference of a tubing component when disposed thereon. In general, however, the blade elements 62 can be configured for a spiral-blade or straight-blade configuration when installed on a tubing component.

The blade elements 62 can be formed of a metal material, such as steel, aluminum alloy, or the like. The blade elements 62 can be formed from stamped stock, mechanically extruded from stock, and/or hydroformed plate material. The blade elements 62 can also be composed of other rigid materials, such as a composite material, a fiber-reinforced polymer, and the like, can be used. In general, the blade elements 62 and centralizer apparatus 60 can be pre-formed as a ring structure to fit about a cylindrical surface of a tubing component, or the centralizer apparatus 60 and blade elements 62 can be pre-formed as a flat structure, which can then be bent into a bent condition and wrapped to fit about a cylindrical surface of a tubing component.

In general, the blade elements 62 of the centralizer apparatus 60 can reduce drag forces while running a tubing component downhole, and the blade elements 62 can glide smoothly on a low side of a borehole wall. Meanwhile, the shape of the blade elements 62 may be meant to be hydrodynamic and to improve mud displacement, reducing pressure drop and local turbulences across the centralizer apparatus 60.

Figure 3A:
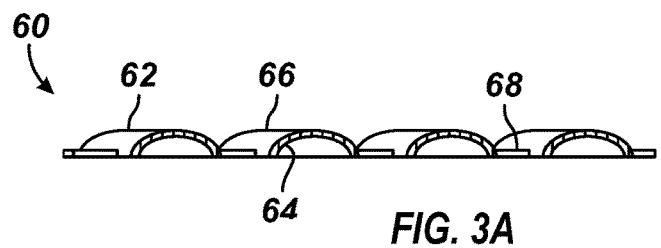
FIG. 3A illustrates a cross-sectional view of one arrangement of blade elements for the centralizer apparatus.
Figure 3B:
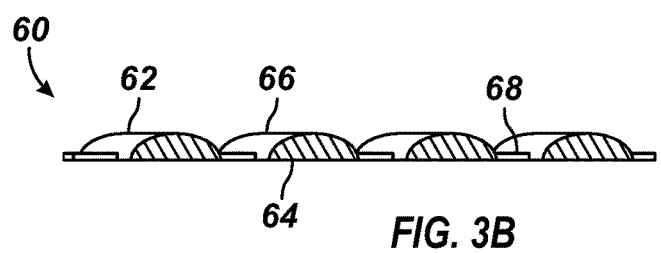
FIG. 3B illustrates a cross-sectional view of another arrangement of the blade elements for the centralizer apparatus.

As shown in the cross-sectional views of FIGS. 3A-3B, the blade elements 62 have first and second opposing faces 64, 66. The first opposing face 64 (i.e., internal) face 64 is configured to be placed adjacent to the surface of the tubing component. The second opposing face 66 (i.e., external face) of the blade elements 62 is intended to extend outward from the tubing's circumference.

In the example of FIG. 3A, the blade element 62 is a hollow vane having a bent contour. The internal face 64 can be a concave face, and the external face 66 can be a convex face. The at least one interconnecting element 68 can be interconnected at the edges of the blade elements 62 toward the external face 66 so the centralizer apparatus 60 can fit flush against the surface of the tubing component.

Accordingly, in the example of FIG. 3A, the blade elements 62 can be hollow vanes/collapsible blades that are meant to collapse during use under certain circumstances. The collapsible nature of the blade elements 62 can allow the tubing component to pass a restriction without causing elevated loads on the tubing component that can lead to damage of pipe connections or a stuck pipe condition. In the example of FIG. 3B, by contrast, the blade elements 62 can be solid ribs or vane structures composed of solid material.

Various processes are contemplated for manufacturing the centralizer apparatus 60. In one arrangement, a flat piece of stock material, such as metal material in a flat condition, may be hydroformed with the desired profile of the blade elements 62 as shown in FIG. 3A. The blade elements 62 as separate components can then be affixed (welded) to the interconnecting element 68, or the blade elements 62 and interconnecting element 68 can be formed from a unitary piece of stock.

In pre-manufacturing steps, the centralizer apparatus 60 can be bent into a bent condition and formed about a cylindrical mandrel so the centralizer apparatus 60 can be shaped to fit onto a tubing component at a later time during manufacture. Alternatively, the centralizer apparatus 60 can be bent directly into a bent condition onto the surface of the tubing component when the centralizer apparatus 60 is installed and affixed thereon. Other manufacturing processes such as foundry casting, hot stamping, forging, cold-work stamping, and the like may also be used to produce the centralizer apparatus 60.

Figure 4A:
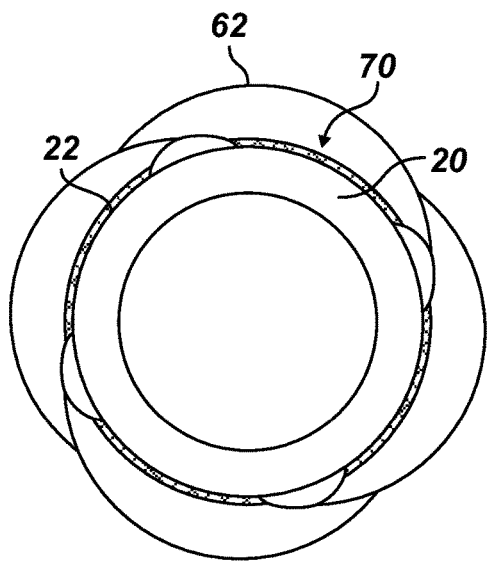
FIG. 4A illustrates a top-down view of the centralizer apparatus formed into a ring for placement around a tubular.

The centralizer apparatus 60 is configured to wrap end-to-end to form a ring or collar structure about the circumference of a tubing component. As shown in the schematic end view of FIG. 4A, the ring structure of the centralizer apparatus 60 can be wrapped and disposed circumferentially about the surface 22 of the tubular 20. A spray welding material 70 is at least coated over the interconnecting element (68) to hold the blade elements 62 adjacent to the surface 22 of the tubular 20. Preferably, the spray welding material 70 is configured to coat over at least a portion of the plurality of blade elements 62, over the interconnecting element (68), and over at least an adjacent portion of the surface 22 of the tubular 20 to affix the blade elements 62 in place.

Figure 4B:
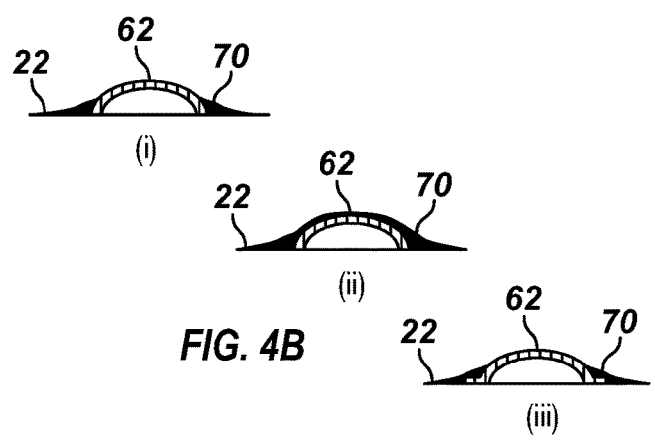
FIG. 4B illustrates some depictions of spray weld material coating applied on a blade element and a surface of a tubular.

Example details for coating of the spray welding material 70 are schematically depicted in FIG. 4B. As shown in the first depiction (i), the spray welding material 70 can coat at least the edges of a blade element 62 and adjacent portions of the tubing's surface 22. As shown in the second depiction (ii), the spray welding material 70 can coat over more of the blade element 62 and adjacent portions of the tubing's surface 22. Finally, as shown in the third depiction (iii), the blade elements 62 may include flanges, tabs, or extension at the edges to facilitate coverage of the spray welding material 70 between adjacent portions of the blade element 62 and tubing's surface 22.

Various techniques can be used for coating the spray welding material during manufacture of the centralizer apparatus 60 on a tubular 20. For example, a twin-wire arc thermal spray process (TWA) can be used in which metallic, conductive wires charged with opposing polarity are fed into an arc gun. The meeting tips of the wires melt, and compressed air atomizes the molten material, which is accelerated onto areas of centralizer apparatus 60 and tubular 20 to produce the coating or spray welding material 70 that affixes the blade elements 62 in place. Alternatively, other spray welding processes can be used, including a combustion powder spray process, a wire spray process, a High-Velocity Oxygen Fuel Spray process, a cold spray process, a detonation spray process, a plasma spray process, a laser cladding process, or another electric arc spray process. These and other spray weld processes can be used.

Figure 5A:
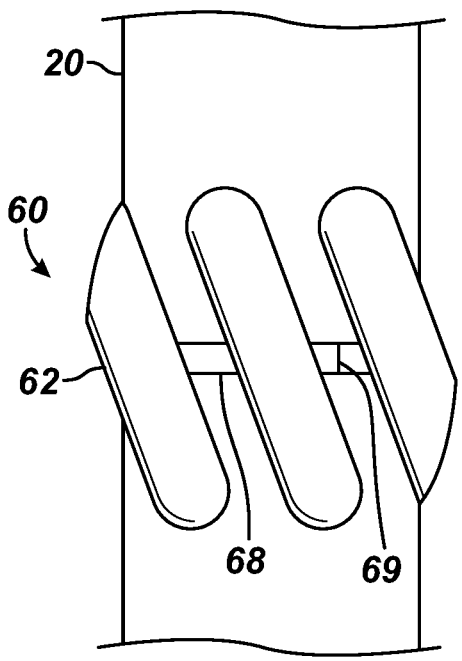
FIGS. 5A-5B illustrate elevational views of a centralizer apparatus positioned on, and spray welded to, a tubular.
Figure 5B:
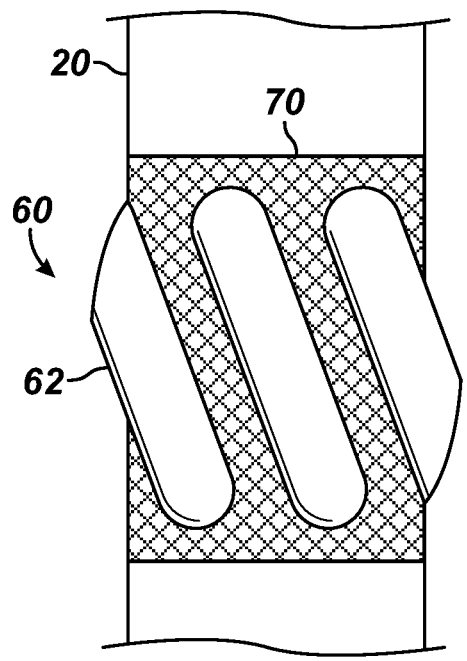

FIGS. 5A-5B illustrate elevational views of a centralizer apparatus 60 positioned on, and affixed to, a tubular 20. As shown in FIG. 5A, the centralizer apparatus 60 is disposed on (e.g., slipped on or wrapped around) the circumference of the tubular 20 so that the interconnecting element 68 meets end-to-end. Ends 69 of the interconnecting element 68 can be connected with a fastener (not shown), an interlock, an adhesive, a tack weld, or another form of connection to keep the centralizer apparatus 60 in place at least temporarily. As shown here, the blade elements 62, which are elongated, are arranged to spiral about the circumference relative to a longitudinal axis to the tubular 20.

As shown FIG. 5B, a spray welding material 70 is applied to affix the blade elements 62 to the tubular 20. The spray welding material 70 can be coated over at least a portion of the plurality of blade elements 62, such as at least on the edges, and the spray welding material 70 can be coated over at least an adjacent portion of the surface of the tubular 20. The spray welding material 70 can also be coated over the interconnecting element (68) between the blade elements 62. In any event, the spray welding material 70 can be applied thoroughly over the blade elements 62, interconnecting element 68, and adjacent portions of the tubular 20 to fix the blade elements 62 in place.

Nevertheless, when the blade elements 62 are hollow vanes or fins made of bent pate material having a concave face adjacent the surface of the tubular 20, the blade elements 62 can deform or collapse when encountering an obstruction downhole. As noted, such hollow blade elements 62 are designed to collapse with a predetermined side force so the centralizer apparatus 60 can pass through a restriction when a stuck-pipe condition is encountered. This feature allows the tubular 20 to be safely run or pulled without the danger of being lost in the hole due to a permanently stuck pipe.

Figure 6A:
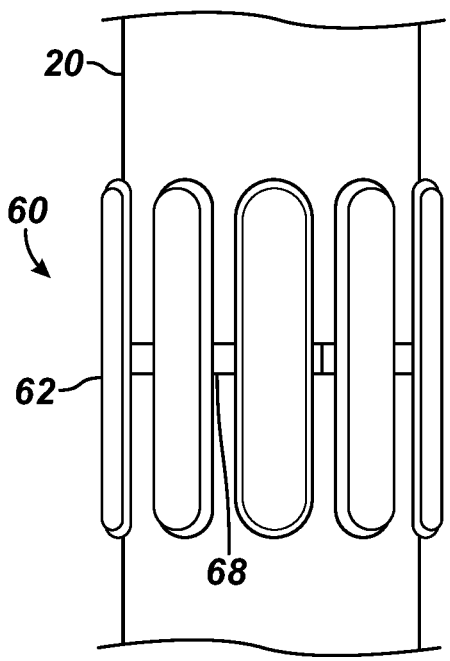
FIGS. 6A-6B illustrate elevational views of another centralizer apparatus positioned on, and spray welded to, a tubular.
Figure 6B:
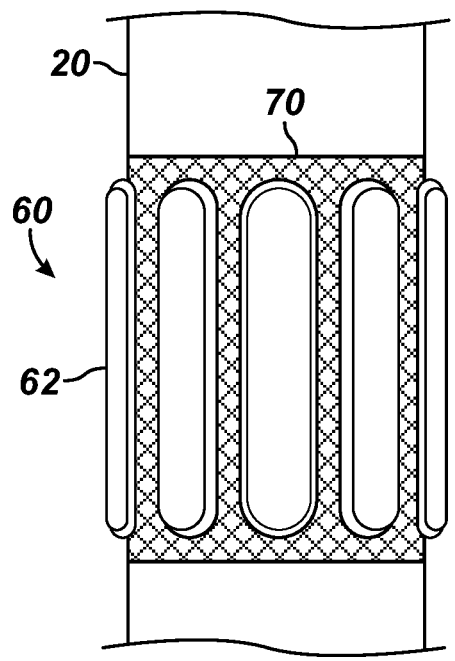
Figure 7A:
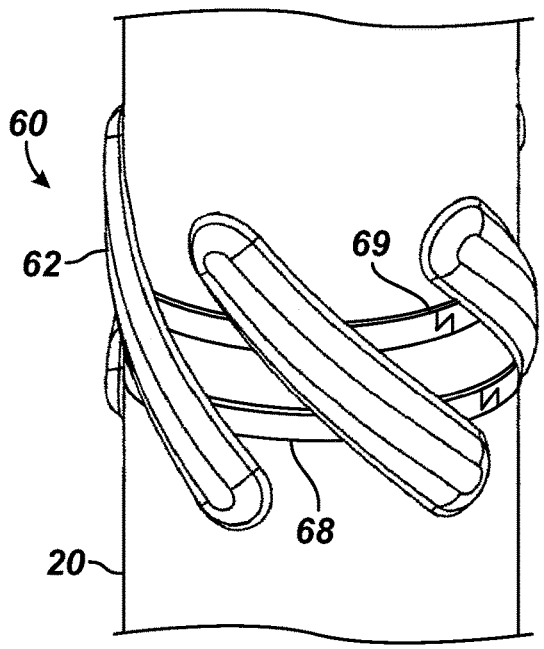
FIGS. 7A-7B illustrate elevational views of yet another centralizer apparatus positioned on, and spray welded to, a tubular.
Figure 7B:
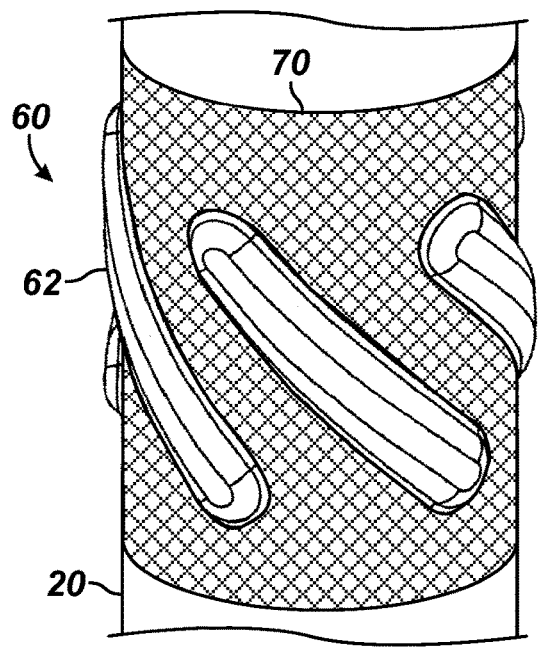

FIGS. 6A-6B illustrate elevational views of another centralizer apparatus 60 positioned on, and affixed to, a tubular 20. Here, the blade elements 62 are arranged in a straight configuration so that the longitudinal lengths of the blade elements 62 are aligned with the longitudinal axis of the tubular 20. Meanwhile, FIGS. 7A-7B illustrate elevational views of yet another centralizer apparatus 60 positioned on, and affixed to, a tubular 20. In this arrangement, the blade elements 62 are interconnected by a plurality of interconnecting elements 68, such as multiple bands. As an example, ends 69 of the interconnecting elements are shown with interlocks.

In general, each of the of blade elements 62 as previously depicted can have a rounded, external face extending along a longitudinal length between opposing ends. Additionally, the opposing ends can be rounded. Therefore, the blade elements 62 can be wide and symmetrical fins and can be rounded and smooth at both ends to glide easily over restrictions.

Figure 8A:
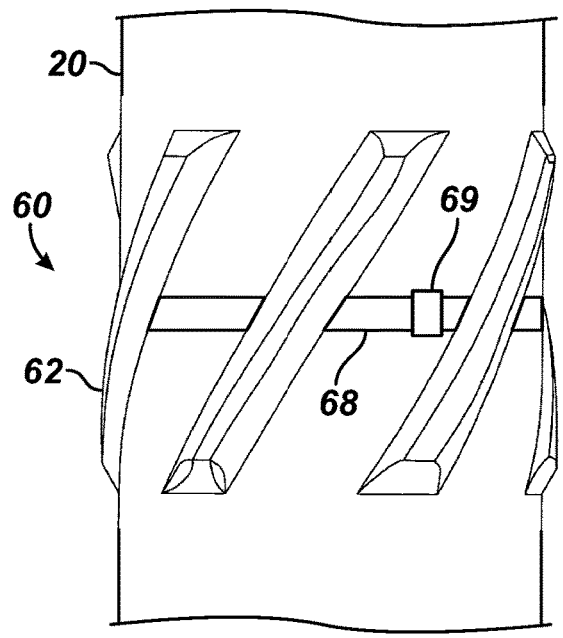
FIGS. 8A-8B illustrate elevational views of another centralizer apparatus positioned on, and spray welded to, a tubular.
Figure 8B:
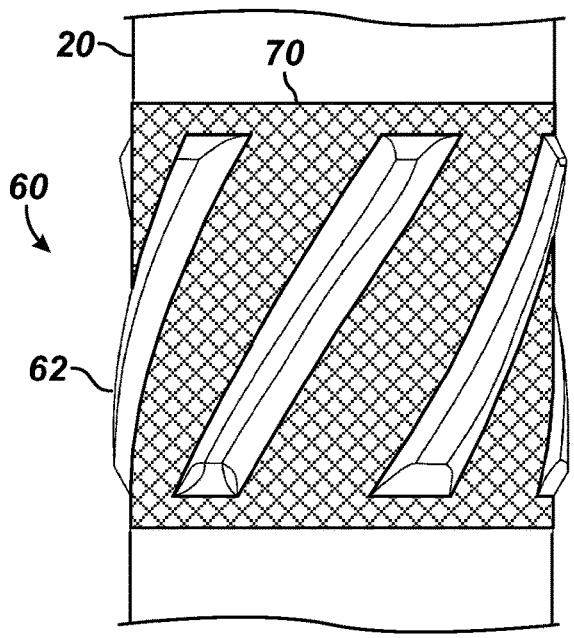

Other shapes can be used. For example, FIGS. 8A-8B illustrate elevational views of another centralizer apparatus 60 having blade elements 62 of a different shape. Here, these blade elements 62 form narrower, symmetrical fins that are beveled. These and other shapes can be used. As an example, ends 69 of the interconnecting element 80 are shown with a lock or fastener.

FIG. 9 is a flow chart of a process 100 according to the present disclosure to prepare a wellbore tubular for downhole use. According to the present example, one or more process blocks of FIG. 9 may be used to prepare a wellbore tubular (20) to have a centralizer apparatus (50, 60) as discussed above.

As shown in FIG. 9, the process 100 includes placing a plurality of blade elements (62) about a surface of the tubular (20) (Block 110). For example, a plurality of blade elements (62) interconnected by at least one interconnecting element (68) can be wrapped about a surface of the tubular (20) (Block 112). In another example, a plurality of blade elements (62) can be pre-formed into a ring structure that can then be slipped onto the tubular (20) (Block 114). In other examples, placing the plurality of blade elements (62) about the surface of the tubular (20) can include: aligning longitudinal lengths of the plurality of blade elements (62) longitudinally relative to a longitudinal axis of the tubular (20); or spiraling the longitudinal lengths of the plurality of blade elements (68) relative to the longitudinal axis of the tubular (20) (Block 116).

As shown in FIG. 9, the process 100 includes affixing the plurality of blade elements to the surface of the tubular (20) (Block 120). For example, spray welding material can be coated over at least a portion of the blade elements and over at least an adjacent portion of the surface of the tubular (20) (Block 122). Additionally, spray welding material can be coated over at least a portion of the interconnecting element (68) and over at least an adjacent portion of the surface of the tubular (20) (Block 124).

Coating the spray welding material may include performing at least one of an electric arc spray process, a twin-wire arc thermal spray process (TWA), a combustion powder spray process, a wire spray process, a High-Velocity Oxygen Fuel Spray process, a cold spray process, a detonation spray process, a plasma spray process, and a laser cladding process (Block 126).

It should be noted that while FIG. 9 shows example blocks of the process 100, in some implementations, the process 100 may include additional blocks, fewer blocks, different blocks, or differently arranged blocks than those depicted in FIG. 9. Additionally, or alternatively, two or more of the blocks of the process 100 may be performed in parallel.

The foregoing description of preferred and other arrangements is not intended to limit or restrict the scope or applicability of the inventive concepts conceived of by the Applicants. It will be appreciated with the benefit of the present disclosure that features described above in accordance with any arrangement or aspect of the disclosed subject matter can be utilized, either alone or in combination, with any other described feature, in any other arrangement or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of preparing a tubular for downhole use, the method comprising:
   placing a plurality of blade elements about a surface of the tubular, each of the plurality of blade elements comprising a hollow vane having a bent contour with a concave face and a convex face, wherein placing the plurality of blade elements about the surface of the tubular comprises placing the concave face against the surface of the tubular; and
   affixing the plurality of blade elements to the surface of the tubular by coating a spray welding material over at least a portion of the plurality of blade elements and over at least an adjacent portion of the surface of the tubular.

2. The method of claim 1, wherein coating the spray welding material over at least the portion of the plurality of blade elements and over at least the adjacent portion of the surface of the tubular comprises coating the spray welding material over at least a portion of an edge on the convex face of the hollow vanes.

3. The method of claim 1, comprising initially forming the plurality of blade elements by performing at least one of:
   forming the plurality of blade elements from a plate material;
   forming the plurality of blade elements with at least one interconnecting element integrally connected therebetween;
   forming the plurality of blade elements and affixing the plurality of blade elements to at least one interconnecting element;
   pre-forming the plurality of blade elements in a bent condition to place against a circumference; and
   pre-forming the plurality of blade elements in a flat condition to bend against a circumference.

4. The method of claim 1, wherein placing the plurality of blade elements about the surface of the tubular comprising:
   aligning longitudinal lengths of the plurality of blade elements longitudinally relative to a longitudinal axis of the tubular; or
   spiraling the longitudinal lengths of the plurality of blade elements relative to the longitudinal axis of the tubular.

5. The method of claim 1, wherein coating the spray welding material comprises performing at least one of an electric arc spray process, a twin-wire arc thermal spray process (TWA), a combustion powder spray process, a wire spray process, a High-Velocity Oxygen Fuel Spray process, a cold spray process, a detonation spray process, a plasma spray process, and a laser cladding process.

6. A method of preparing a tubular for downhole use, the method comprising:
   placing a plurality of blade elements about a surface of the tubular by wrapping at least one interconnecting element about the surface of the tubular, the at least one interconnecting element interconnecting the plurality of blade elements; and
   affixing the plurality of blade elements to the surface of the tubular by coating a spray welding material over at least a portion of the plurality of blade elements and over at least an adjacent portion of the surface of the tubular.

7. The method of claim 6, wherein each of the plurality of blade elements comprises at least one of an elongated blade, vane, fin, and rib having a longitudinal length between opposing ends, having a width between opposing sides, and having a thickness between first and second opposing faces; wherein placing the plurality of blade elements about the surface of the tubular comprises placing the first opposing faces against the surface of the tubular; and wherein coating the spray welding material comprises coating the spray welding material on at least a portion of edges on the second opposing faces of the blade elements.

8. The method of claim 6, wherein each of the plurality of blade elements comprises a solid rib having first and second opposing faces; wherein placing the plurality of blade elements about the surface of the tubular comprises placing the first opposing faces against the surface of the tubular; and wherein coating the spray welding material comprises coating the spray welding material on at least a portion of edges on the second opposing faces of the blade elements.

9. The method of claim 6, wherein coating the spray welding material over at least the portion of the plurality of blade elements and the surface of the tubular adjacent thereto comprises coating the spray welding material over the at least one interconnecting element.

10. The method of claim 6, comprising initially forming the plurality of blade elements by performing at least one of:
forming the plurality of blade elements from a plate material;
forming the plurality of blade elements with the at least one interconnecting element integrally connected therebetween;
forming the plurality of blade elements and affixing the plurality of blade elements to the at least one interconnecting element;
pre-forming the plurality of blade elements in a bent condition to place against a circumference; and
pre-forming the plurality of blade elements in a flat condition to bend against a circumference.

11. The method of claim 6, wherein placing the plurality of blade elements about the surface of the tubular comprising:
aligning longitudinal lengths of the plurality of blade elements longitudinally relative to a longitudinal axis of the tubular; or
spiraling the longitudinal lengths of the plurality of blade elements relative to the longitudinal axis of the tubular.

12. The method of claim 6, wherein coating the spray welding material comprises performing at least one of an electric arc spray process, a twin-wire arc thermal spray process (TWA), a combustion powder spray process, a wire spray process, a High-Velocity Oxygen Fuel Spray process, a cold spray process, a detonation spray process, a plasma spray process, and a laser cladding process.

13. A tubular, comprising:
a plurality of blade elements disposed about a surface of the tubular;
at least one interconnecting element connected between the blade elements; and
a spray welding material coated over at least a portion of the plurality of blade elements, over the at least one interconnecting element, and over at least an adjacent portion of the surface of the tubular,
wherein each of the blade elements comprises a hollow vane having a bent contour with a concave face and a convex face, the concave face being placed against the surface of the tubular; and wherein the spray welding material is coated over at least a portion of an edge on the convex face of the hollow vanes.

14. The tubular of claim 13, wherein at least one of:
the plurality of blade elements comprises a plate material;
the plurality of blade elements has the at least one interconnecting element integrally connected therebetween;
the plurality of blade elements is affixed to the at least one interconnecting element;
the plurality of blade elements is pre-formed in a bent condition to place against a circumference; and
the plurality of blade elements is pre-formed in a flat condition to bend against a circumference.

15. The tubular of claim 13, wherein longitudinal lengths of the plurality of blade elements align longitudinally relative to a longitudinal axis of the tubular or spiral relative to the longitudinal axis of the tubular.

16. The tubular of claim 13, wherein the spray welding material is deposited by at least one of an electric arc spray process, a twin-wire arc thermal spray process (TWA), a combustion powder spray process, a wire spray process, a High-Velocity Oxygen Fuel Spray process, a cold spray process, a detonation spray process, a plasma spray process, and a laser cladding process.

17. A tubular, comprising:
a plurality of blade elements disposed about a surface of the tubular;
at least one interconnecting element connected between the blade elements; and
a spray welding material coated over at least a portion of the plurality of blade elements, over the at least one interconnecting element, and over at least an adjacent portion of the surface of the tubular,
wherein each of the plurality of blade elements comprises at least one of an elongated blade, vane, fin, and rib having a longitudinal length between opposing ends, having a width between opposing sides, and having a thickness between first and second face, the first face positioned against the surface of the tubular; and wherein the spray welding material is coated over at least a portion of the second face.

18. The tubular of claim 17, wherein each of the plurality of blade elements comprises a solid rib having the first and second faces, the first face being placed against the surface of the tubular; and wherein the spray welding material is coated over at least an edge of the second face of the solid ribs.

19. The tubular of claim 17, wherein at least one of:
the plurality of blade elements comprises a plate material;
the plurality of blade elements has the at least one interconnecting element integrally connected therebetween;
the plurality of blade elements is affixed to the at least one interconnecting element;
the plurality of blade elements is pre-formed in a bent condition to place against a circumference; and
the plurality of blade elements is pre-formed in a flat condition to bend against a circumference.

20. The tubular of claim 17, wherein the longitudinal lengths of the plurality of blade elements align longitudinally relative to a longitudinal axis of the tubular or spiral relative to the longitudinal axis of the tubular.

21. The tubular of claim 17, wherein the spray welding material is deposited by at least one of an electric arc spray process, a twin-wire arc thermal spray process (TWA), a combustion powder spray process, a wire spray process, a High-Velocity Oxygen Fuel Spray process, a cold spray process, a detonation spray process, a plasma spray process, and a laser cladding process.

* * * * *